United States Patent
Malhotra et al.

(10) Patent No.: US 10,621,246 B2
(45) Date of Patent: Apr. 14, 2020

(54) SYSTEMS AND METHODS FOR BUILDING AN ON-DEVICE TEMPORAL WEB INDEX FOR USER CURATED/PREFERRED WEB CONTENT

(71) Applicant: Apple Inc., Cupertino, CA (US)

(72) Inventors: Anubhav Malhotra, Sunnyvale, CA (US); John M. Hörnkvist, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 15/721,162

(22) Filed: Sep. 29, 2017

(65) Prior Publication Data

US 2018/0349498 A1    Dec. 6, 2018

Related U.S. Application Data

(60) Provisional application No. 62/514,722, filed on Jun. 2, 2017.

(51) Int. Cl.
| | |
|---|---|
| *G06F 16/00* | (2019.01) |
| *G06F 16/951* | (2019.01) |
| *G06F 16/957* | (2019.01) |
| *G06F 16/958* | (2019.01) |

(52) U.S. Cl.
CPC .......... *G06F 16/951* (2019.01); *G06F 16/957* (2019.01); *G06F 16/958* (2019.01)

(58) Field of Classification Search
CPC .............................. G06F 16/951; G06F 16/957
USPC ....................................................... 707/711
See application file for complete search history.

(56) References Cited

U.S. PATENT DOCUMENTS

| | | | | |
|---|---|---|---|---|
| 8,122,029 | B2* | 2/2012 | Loofbourrow | G06F 16/2272 707/742 |
| 8,380,743 | B2 | 2/2013 | Convertino et al. | |
| 9,384,211 | B1 | 7/2016 | Castillo et al. | |
| 2007/0033191 | A1* | 2/2007 | Hornkvist | G06F 16/90335 |
| 2010/0262608 | A1* | 10/2010 | Hornkvist | G06F 16/2228 707/742 |
| 2011/0113052 | A1* | 5/2011 | Hornkvist | G06F 16/319 707/759 |
| 2012/0109970 | A1* | 5/2012 | Hornkvist | G06F 16/3338 707/742 |
| 2013/0151549 | A1* | 6/2013 | Papamiltiadis | G06F 16/48 707/769 |
| 2014/0181186 | A1* | 6/2014 | Stevens | H04L 67/322 709/203 |
| 2015/0100569 | A1 | 4/2015 | Reid De Sousa | |

* cited by examiner

*Primary Examiner* — Monica M Pyo
(74) *Attorney, Agent, or Firm* — Jaffery Watson Mendonsa & Hamilton LLP

(57) ABSTRACT

A method and apparatus of a device that indexes donatable content from a network site is described. In an exemplary embodiment, the device receives a requested document, where the requested document includes a plurality of tags. In addition, the device detects a donatable tag in the plurality tags that indicates the network site includes donatable content. In response to the detecting, the device sends a request for the donatable content to the network site. Furthermore, the device receives the donatable content from the network site. The device additionally indexes the donatable content into an on-device search index, where at least some of the index donatable content is further returned as a search result for an on-device search.

15 Claims, 8 Drawing Sheets

SYSTEMS AND METHODS FOR BUILDING AN ON-DEVICE TEMPORAL WEB INDEX FOR USER CURATED/PREFERRED WEB CONTENT

RELATED APPLICATIONS

Applicant claims the benefit of priority of prior, co-pending provisional application Ser. No. 62/514,722, filed Jun. 2, 2017, the entirety of which is incorporated by reference.

FIELD OF INVENTION

This invention relates generally to search technology and more particularly to indexing content donated by a remote source.

BACKGROUND OF THE INVENTION

A user can perform a query search to lookup information stored on a device. A query search begins with a client on the device receiving the query string, which is sent to a local search module. The client can be one of variety of applications that support local search (e.g., mail, media, calendar, and the file browser). The local search module receives query string and searches a search index for results that match this query string. The local search module uses a local search index to complete the search, where the local search index is an index of objects that reside on the device. For example, the local search index can include metadata corresponding the indexed objects. The local search module then returns the results to the client.

In addition or instead of, this query string can be sent to a remote search server. The search server uses this query string to perform a search on the index of the search server and return results to the device. The returned results do not include the rich amount of metadata that the objects indexed in the local search index may have. In addition, the search server may not index certain objects that are available to the user (e.g., objects stored in a cloud-based office software suite).

SUMMARY OF THE DESCRIPTION

A method and apparatus of a device that indexes donatable content from a network site is described. In an exemplary embodiment, the device receives a requested document, where the requested document includes a plurality of tags. In addition, the device detects a donatable tag in the plurality tags that indicates the network site includes donatable content. In response to the detecting, the device sends a request for the donatable content to the network site. Furthermore, the device receives the donatable content from the network site. The device additionally indexes the donatable content into an on-device search index, where at least some of the index donatable content is further returned as a search result for an on-device search.

In one embodiment, the donatable content includes metadata associated with one or more downloadable objects from the network site and each of the metadata can include a time-to-live, wherein the metadata is removed from the index when the time-to-live expires for a corresponding downloadable object. The requested document can be a web page.

In a further embodiment, the device authenticates the user with the network site. The donatable content includes a cloud-based document associated with a cloud-based application, where the cloud-based document is associated with the authenticated user. In addition, the device may prompt the user to download the donatable content.

In one embodiment, a machine-readable medium having executable instructions to cause one or more processing units to perform a method to index donatable content from a network site is described. In an exemplary embodiment, the machine-readable medium method receives, with a device, a requested document, where the requested document includes a plurality of tags. In addition, the machine-readable medium method detects a donatable tag in the plurality tags that indicates the network site includes donatable content. In response to the detecting, the machine-readable medium method sends a request for the donatable content to the network site. Furthermore, the method receives the donatable content from the network site. The machine-readable medium method additionally indexes the donatable content into an on-device search index, where at least some of the index donatable content is further returned as a search result for an on-device search.

In one embodiment, the donatable content includes metadata associated with one or more downloadable objects from the network site and each of the metadata includes a time-to-live, wherein the metadata is removed from the index when the time-to-live expires for a corresponding downloadable object. The requested document can be a web page.

In a further embodiment, the machine-readable medium method authenticates the user with the network site. The donatable content includes a cloud-based document associated with a cloud-based application, where the cloud-based document is associated with the authenticated user. In addition, the machine-readable medium method may prompt the user to download the donatable content.

In a further embodiment, a method to index donatable content from a network site is described. In an exemplary embodiment, the method receives, with a device, a requested document, where the requested document includes a plurality of tags. In addition, the method detects a donatable tag in the plurality tags that indicates the network site includes donatable content. In response to the detecting, the method sends a request for the donatable content to the network site. Furthermore, the method receives the donatable content from the network site. The method additionally indexes the donatable content into an on-device search index, where at least some of the index donatable content is further returned as a search result for an on-device search.

In one embodiment, the donatable content includes metadata associated with one or more downloadable objects from the network site and each of the metadata includes a time-to-live, wherein the metadata is removed from the index when the time-to-live expires for a corresponding downloadable object. The requested document can be a web page.

In a further embodiment, the method authenticates the user with the network site. The donatable content includes a cloud-based document associated with a cloud-based application, where the cloud-based document is associated with the authenticated user. In addition, the method may prompt the user to download the donatable content.

In one embodiment, a device to index donatable content from a network site is described. The device includes a processor and memory coupled to the processor though a bus. The device further includes a process, executed from the memory by the processor, that causes the processor to receive a requested document from the network site, where the requested document includes a plurality of tags. The process further causes the processor to detect a donatable tag in the plurality tags that indicates the network site includes donatable content. In addition, and in response to the detecting, the process further causes the processor to sending a request for the donatable content to the network site. Furthermore, the process further causes the processor to send a request for the donatable content to the network site, receive the donatable content from the network site, and index the donatable content into an on-device search index, wherein at least some of the index donatable content is further returned as a search result for an on-device search. In addition, the donatable content can include metadata associated with one or more downloadable objects from the network site.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
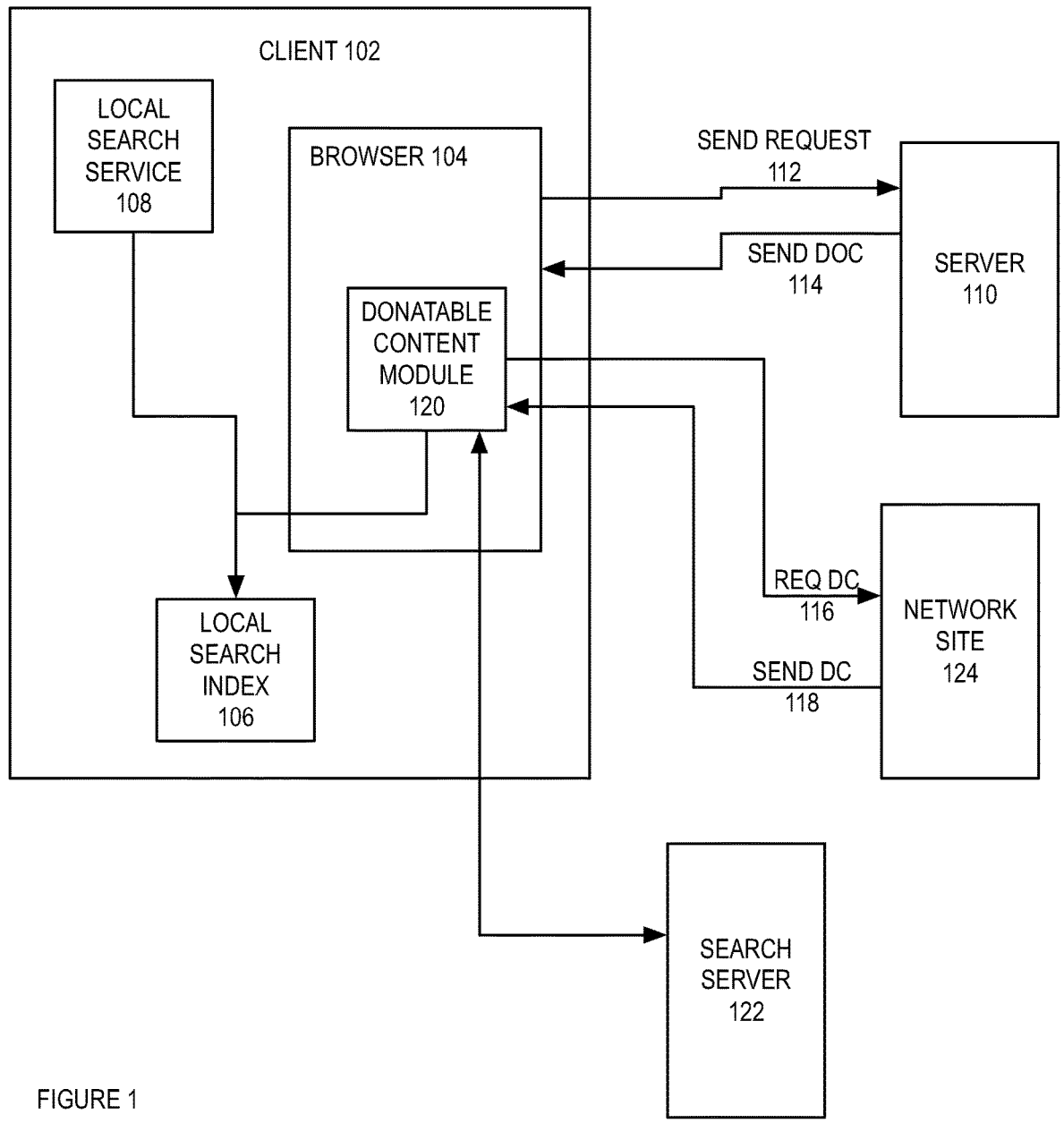
FIG. 1 is a block diagram of one embodiment of a system that indexes donatable content.

A method and apparatus of a device that indexes donatable content from a network site is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that indexes donatable content from a network site is described. In one embodiment, the device sends a document request to a server. In this embodiment, the document request can be a HyperText Transfer Protocol (HTTP) request for a web page (e.g., a HyperText Markup Language (HTML) document). The device receives the document and starts to process the document. In one embodiment, the document can include multiple tags of varying types. One of the types of tags can be a donatable content tags. In this embodiment, a donatable content tag is a tag that indicates that donatable content is available from a network site. In one embodiment, the network site can be a web site, server, cluster of server, and/or another device that can provide objects to the client over a network. For example and in one embodiment, the donatable content could be metadata related to various downloadable objects that are accessible from the network site.

In one embodiment, the device can request the donatable content and use this donatable content to index the related downloadable objects in a local search index. In this embodiment, by indexing the downloadable objects using the donatable contents, a user can use a local search service to perform a search and receive results that include one or more of the downloadable objects.

FIG. 1 is a block diagram of one embodiment of a system that indexes donatable content. In FIG. 1, the system 100 includes a client 102, a server 110, a search server 122 coupled by a network (not illustrated). In one embodiment, the server 110 is a collection of one or more servers that receives document requests from client 102 and/or other devices and returns the document back to those devices. In one embodiment, the server 110 can be a web server, file server, database, and/or another type of device that serve document requests. In one embodiment, the client 102, server 110, and/or search server 122 can be personal computer, laptop, server, mobile device (e.g., smartphone, laptop, personal digital assistant, music playing device, gaming device, etc.), and/or any device capable requesting a search and/or displaying search results. In one embodiment, the client 102, and/or server 110 can be a physical or virtual device. In one embodiment, the smartphone can be a cellular telephone that is able to perform many functions of client 102.

In one embodiment, the client 102 includes a browser 104, local device index, and local search service 108. In one embodiment, browser 104 can be a web browser and/or a file browser. In this embodiment, the browser 104 can be used to request and view various types of documents that accessible from the server 110. Furthermore, the browser 104 can include a search input field that is used by the user to input the search query. In one embodiment, a web browser is a program that allows a user to search the web and/or other search domains and retrieve for various types of documents. In an alternative embodiment, the browser can be another type of application that allows a user to retrieve one or more documents and/or input a search query, which is used to search on-device and/or off-device search domains. In one embodiment, the browser includes a search input field, where the search input field is used by the user to input a search request string.

In one embodiment, the client 102 can includes additional applications (not illustrated) that use a local search service to perform a search of objects stored on the client 102. In this embodiment, a search is a search of the objects stored on the client 102. For example and in one embodiment, the objects can be documents, pictures, music, applications, email, calendar entries, and/or other types of objects stored in the client 102. In one embodiment, the search is based on a local search index 106 that is maintained by the client 102. In this embodiment, the index is an index of the metadata stored in objects of the device.

In one embodiment, each of the metadata stored in the index has a type. For example and in one embodiment, the metadata types can include creation date, modification date, upload date, files size, file type, attachment type (PDF, JPEG, etc.), metadata types within the object (e.g., "To," "From," "CC," "Subject," ID3 tags with media, "Date," "Time," "location," "name," "address," etc.), and/or other data types stored within each of the objects. The metadata contents and types are stored in the local search index 106. To search this index 106, the applications can each capture a query prefix and send this query prefix to the local search service 108, which in turn, uses the query prefix to perform the search using the local search index 106. For example and in one embodiment, a mail application includes a search field to search for relevant emails or used for a general search using the local search service 108. Similarly, the applications calendar, media player, file browser, and/or other applications (e.g., contacts) can use local search service 108 to search for objects stored on the device 100. In one embodiment, because the objects that are indexed in the local search index 106 reside on the client, the local search index 106 can include a rich amount of metadata for each object that is indexed. In another embodiment, local search service 108 is partially or fully encompassed in the application itself.

In one embodiment, the browser 104 can request document(s) from a server, such as the server 110. In another embodiment, the browser can send a query prefix to a search server 122, where the server 122 uses the query prefix to perform a search and returns the search results to the client 102. In addition, each of the documents in the search results can include some metadata, but the amount of metadata for each of these documents in the search results is less than the metadata stored for the objects indexed in the local search index 106. In one embodiment, this is because local indexing provides a more privacy friendly since websites may not be able to track local searches and the local search index can be encrypted with user's private key. In addition, local indexing is available on-device so connectivity to the index is not mandatory. Furthermore, a single local search index having entries from multiple donating sources yields scope for faster response times and better relevance.

In one embodiment, the server 110 can indicate that there is donatable content available to the client 102, where the client 102 can index this donatable content in the local device index. In this embodiment, the donatable content is metadata that for corresponding downloadable objects that are available from one or more network sites 124. In one embodiment, the network site can include or be separate from the server 100. In one embodiment, some, none, or all of the metadata includes a time-to-live (TTL) value, where the TTL value controls how long one or more of the downloadable objects related to the donatable content remains indexed in the local search index.

For example and in one embodiment, the donatable content could be metadata related to various downloadable objects that are accessible from the network site. If the network site is a storefront, the downloadable objects can be different items that are for sale from the storefront. The donatable contents can be metadata related to all of the objects available in the storefront, or can be for a subset of the downloadable object. In this example, the donatable content can be a subset of the downloadable objects for the user requesting the document, such a subset of the downloadable objects that are related to the document, the user's interests, user's browsing history, and/or some other relation or interest.

In another example, and embodiment, the network site is a cloud service that the user has access to document or objects that are part of the cloud service (e.g., a cloud office suite service). A cloud service may not make available to web search service the objects that are stored in the cloud service. In this example, the donatable content can be metadata relating to objects stored in the cloud service. If the cloud service is a cloud office suite service, the downloadable objects could be the objects that user has created, stored, or been shared, and the donatable content can be metadata relating to some or all of these objects (e.g., word processing, spreadsheet, presentation, and/or other office suite type of objects). By having these objects indexed using the donatable content, the user can perform search and get hits on these objects without having to login into to the cloud service and run another search.

In a further example, the network site could be an online database of information (e.g., library catalog, shopping catalogs (e.g., grocery, fashion, electronics, and/or another type of shopping catalog), news articles and sections (politics, sports, and/or another type of news section), online education websites (e.g., a massive online open course) with sections for each topic (e.g. Science, Mathematics, Computers, and/or other types of topic sections), where the donatable content is metadata relating to some or all of the catalog. In this example, by having metadata for some or all of the database information, this database can be searched using the local device search facility.

The metadata in the donatable content the can be similar in structure to the metadata index for objects stored on the client 102. For example and in one embodiment, the metadata types can include creation date, modification date, upload date, files size, file type, attachment type (PDF, JPEG, etc.), metadata types within the object (e.g., "To," "From," "CC," "Subject," ID3 tags with media, "Date," "Time," "location," "name," "address," etc.), and/or other data types stored within each of the objects.

In this embodiment, the client 102 makes a request for document from the server 110. For example and in one embodiment, the client 102 can make a request for a web page or another type of document (e. g., eXtended Markup Language (XML), another type of markup document, and/or another type of document) to the server 110. For example and in one embodiment, the request can be a HTTP request for the document. In response, the server 110 returns the document to the client 102, where the document can include one or more tags that indicate that donatable content is available to the client 102. In one embodiment, the tag can indicate the type of donatable content that is available and the source of the donatable content. In one embodiment, the client 102 can prompt a user of the client 102 if the user wishes to index the donatable content. If the user indicates for the client 102 to proceed with the indexing of the donatable content, the client 102 requests the donatable content from the source for this donatable content. The client 102 receives the donatable content and indexes this content in the local search index 106. Alternatively, the client 102 can automatically request and index the donatable content in response to detecting the donatable content tag.

For example and in one embodiment, the browser 104 sends a request (112) for the document to the server 110. This request can be from a search results provided by a search server 122, can be linked from another document, or can be input by the user. The server 110 sends the requested document (114) back to the client 102. The document can include one or more tags that indicate that donatable content is available. While in one embodiment, the donatable content is available from the server 110 that sent the requested document, in alternate embodiments, the donatable content is available from other sources (e.g. another server, web site, and/or another type of source). In one embodiment, the tag can include a location for the donatable content (e.g. a Uniform Resource Locator (URL), Uniform Resource Identifier (URI), or some other type of location reference).

With the requested document, the client 104 processes the document (e.g., to display the document). If the client 104 detects a donatable content tag (and the user agrees, if needed), the client 104 makes a request (116) to the network site 124 for the donatable content indicated in the tag. In one embodiment, if the tag includes a URL for the donatable content, the client 104 sends the URL to the network site 124 for the donatable content (e.g., by making a HTTP request using the donatable content URL). The network site 124 sends the donatable content back (118) to the client 104. With the donatable content, the client 104 indexes this content in the local search index 106, where the donatable content is now available to the local search service 108. In one embodiment, applications running on the client 104 can submit queries to the local search service 108, where the local search service 108 uses the local search index 106. In this embodiment, one, some, or all of the query results can be from the donatable content. Thus, downloadable objects appear as being part of the objects stored on the client 102.

In one embodiment, for web services that require (or can use) authentication, a user's login details may be stored in an authentication management mechanism (e.g., a keychain, browser stored authentication, or another type of authentication management mechanism). The browser 104 can use these details to automatically log into the web service. Alternatively, the browser 104 can prompt the user to provide the login details.

In this example, the authenticated web services can donate contents in a file structure to the browser 104 that can be parsed by host operating system. The donated content is added to the local search index to allow for easy searching via local search service 108. In addition, a TTL (time to live) can predefined with some, all, or none of the indexed donatable content, which includes the ability to revoke items once authentication information is removed from system.

For example and in one embodiment, a user logs in to a cloud-based office software suite (e.g. cloud-based word processing, spreadsheet, presentation, and/or other cloud-based applications) with credentials stored in a keychain. In this example, a top-level domain of the cloud-based office software suite can trigger a download of metadata corresponding to the documents to the user via the cloud-based office software suite to the client 102. In this example, the donatable content can be metadata regarding the different user documents of the cloud-based office software suite. Using the metadata, these documents are indexed to the local search index and the user can search for this content using the local search service 108.

In another embodiment, for web content that is not associated with any authentication, the network site 124 can donate metadata for curated content indexing. In this embodiment, when a network site 124 wants to offer donatable contents to be indexed, a user maybe prompted to allow the network site be added to a whitelist. Over a period of time, this whitelist maybe personalized and/or maintained on the client 102. Once whitelisted, the network site 124 can donate metadata (e.g., in a file format that can be parsed by host operating system of the client 102). Similar to authenticated content and by using the metadata, these documents are indexed to the local search index and the user can search for this content using the local search service 108.

For example and in one embodiment, a user navigates to a web site using the browser 104. The web site donates content, such as some or all store items of the web site, including various items and/or services for sale. With these items indexed, the user can search store items using the local search service 108 to surface these results. In addition, a TTL is set on these items that can influence how long the items are maintained in system index.

In one embodiment, the server 110 can further use push-notification to notify the client 102 of donatable content that is available for the client 102 to index. In this embodiment, the server 110 can determine which donatable content to make available depending on whether a user is or has logged into a service provided by the server 110, the user can provide some sort of personalization without logging in (e.g., web browser cookies), or the user may have visited a website without providing personalization. If the user is or has logged into a service the server 110 can provide (e.g., Cloud Office provider), the server 110 can send push notifications to the client 102 regarding donatable content that is known to the server 100 that is available to be indexed by the client 102. For example and in one embodiment, if the user has logged into a Cloud Office or File Storage service, the server 110 uses the user information to determine what content is available to be downloaded for indexing on the client 102. In this example, the server 110 sends the donatable content indication (e.g., one or more links) for the donatable content that can be indexed on the client 102 to the client 102. As an example, the server 110 send a push notification regarding content that was shared with the user. Alternatively, the server 110 can send push notification regarding donatable content by on time. For example and in one embodiment, the server 110 can send a push notification for donatable content for tax documents during a tax season.

In another embodiment, the server 110 sends a push notification regarding the donatable content available from the server 110 using cookies that were available to the server 110 (or another device, not illustrated). Using the information from the cookies, the server 110 determines what donatable content should be made available for the client 102 and sends a push notification for this donatable content that can be indexed on the client 102 to the client 102. For example and in one embodiment, the server 110 can detect that the user has a great interest in gardening (e.g., through the cookies in the web browser) and personalize donatable content using this information (e.g., donatable content regarding gardening tips or gardening products).

If the user is not logged into a service or can indicate personalization information to the server 110, the server 110 can attempt to personalize the donatable content for the user. For example and in one embodiment, the server 110 can receive information from the client 102 regarding the type of results the user engages with in the local search index 106.

Figure 2:
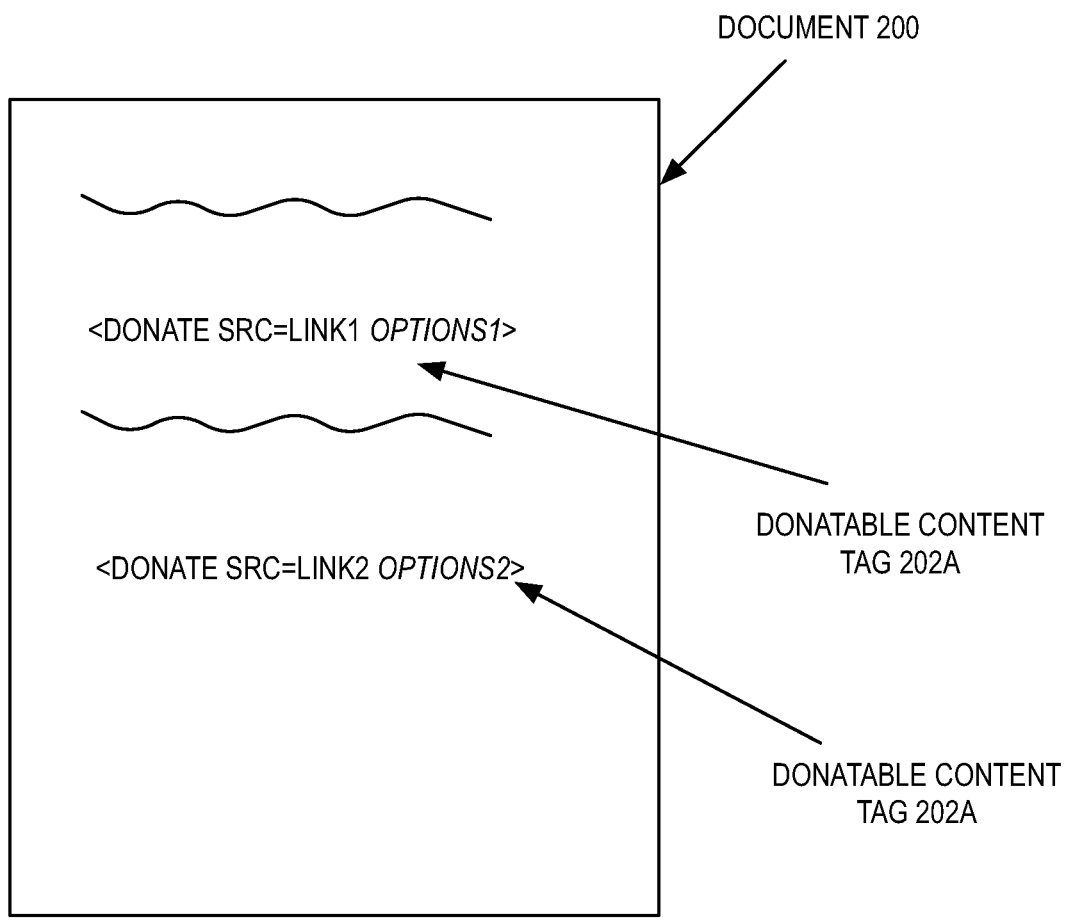
FIG. 2 is a block diagram of one embodiment of a document with a tag indicating that donatable content is available.

FIG. 2 is a block diagram of one embodiment of a document 200 with a tag indicating that donatable content is available. In one embodiment, the document 200 is an HTML document, an XML document, or another type of document. In this embodiment, the document 200 includes multiple different tags (e.g., formatting tags, references to other documents, metadata tags, scripting tags, etc.). In particular, the document 200 can include donatable content tags 202A-B. In one embodiment, each of the donatable content tags 202A-B include a tag marker (e.g., "<," ">," and/or some other type of tag marker), a tag identifier (e.g., the token "donatable" or some other type of tag identifier), a source identifier (e.g., "src" or some other type of source identifier), options, and/or a combination thereof. In this embodiment, the tag marker delineates the tag, the tag identifier identifies the type of tag, and the source identifier is used by the client to request the donatable content. The options can be one or more different options used to choose which of the donatable content is available or otherwise affect the availability or format of the donatable content.

Figure 3:
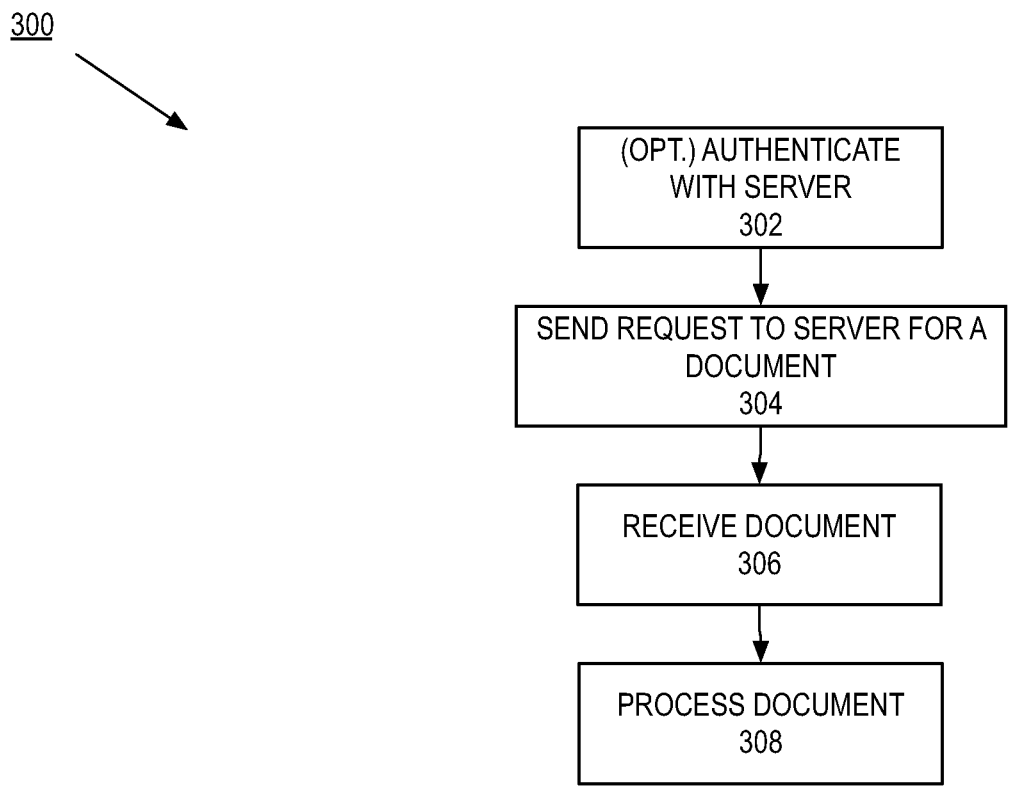
FIG. 3 is a flow diagram of one embodiment of a process to process donatable content from a remote source.

FIG. 3 is a flow diagram of one embodiment of a process 300 to process a document from a remote source. In one embodiment, a browser performs process 300 to process the document, such as browser 104. In FIG. 3, process 300 begins by (optionally) authenticating with the server at block 302. In one embodiment, process 300 can authenticate with stored user credentials or can prompt the user for the user credentials that can be used to authenticate with the server. At block 304, process 300 sends a request to server for a document. In one embodiment, this request can be from a search results provided by a search server, can be linked from another document, or can be input by the user. In one embodiment, the request can be an HTTP request. Process 300 receives the document at block 306.

At block 308, process 300 processes the document. In one embodiment, process 300 parses the documents to determine what types of tags are present in the document, so as to determine how to format and display the document. In one embodiment, the document includes tags for donatable content. Processing the donatable content tags is further describe in FIG. 4 below.

Figure 4:
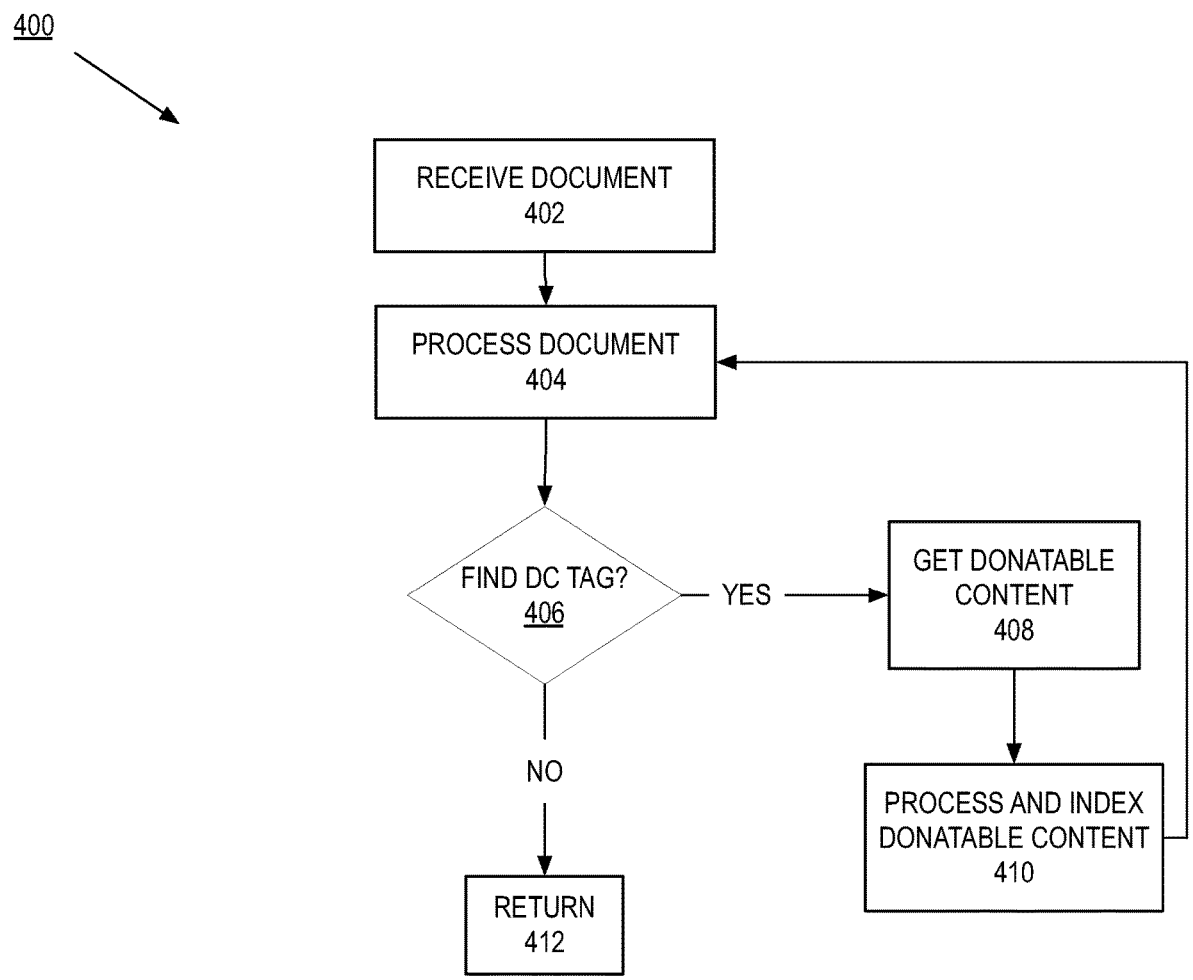
FIG. 4 is flow diagram of one embodiment of a process to process donatable content tags in a document.

FIG. 4 is flow diagram of one embodiment of a process 400 to process donatable content tags in a document. In one embodiment, process 400 is performed by a donatable content module to process donatable content, such as the donatable content module 120 as described in FIG. 1 above. In FIG. 4, process 400 begins by receiving the document at block 402. At block 404, process 400 processes the document. In one embodiment, process 400 processes the document by parses the document and processing the different tags of the document. At block 406, process 400 determines if process 400 finds a donatable content tag. If a donatable content tag is found, process 400 retrieves the donatable content tag, retrieves the source from the tag, and makes a request for the donatable content at block 408. Optionally, process 400 can prompt the user for permission to retrieve the donatable content before requesting the donatable content. At block 410, process 400 processes and indexes the donatable content. In one embodiment, the donatable content is in a format that can be parsed by the operating system of the client. In this embodiment, process 400 determines the metadata from the donatable content for the each of the corresponding downloadable objects associated with this metadata. Process 400 indexes the downloadable objects in the local search index using this metadata. Execution proceeds to block 406 above, where process 400 continues to process the document. If there are no further donatable content tags in the document, execution proceeds to block 412, where process 400 returns.

Figure 5:
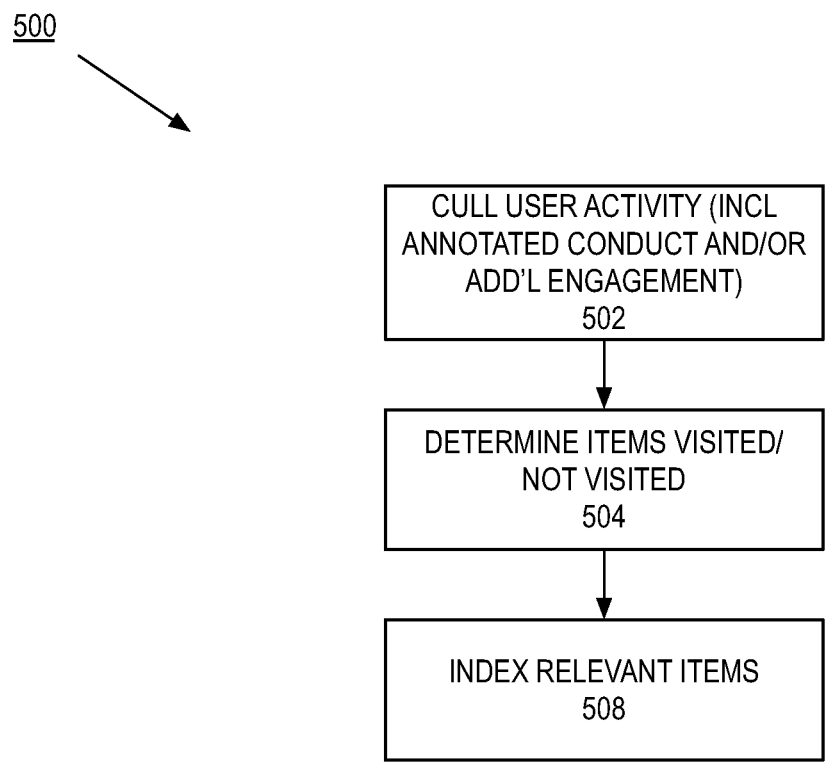
FIG. 5 is a flow diagram of one embodiment of a process to process user activity for indexable content.

FIG. 5 is a flow diagram of one embodiment of a process 500 to process user activity for indexable content. In one embodiment, process 500 is performed by a donatable content module to process donatable content, such as the donatable content module 120 as described in FIG. 1 above. In FIG. 5, process 500 begins by culling user activity at block 502. In one embodiment, the user activity can include annotated conduct and/or additional engagements as a result of the user activity. At block 504, process 500 determines which items were visited and/or not visited. In one embodiment, the engagement model helps process refine what the user is likely to be interested in. For example and in one embodiment, a user may have engaged with the Sports section of a popular online news source. That news website can then donate more items for the sport (e. g., basketball) that the user may have engaged with. Apart from these basketball items, if the news site donates content for 10 different sports, the local index can be smart about picking items for other sports that user is interested in (which it knows from engagement on other news sites). Process 500 indexes the relevant items into the local search index at block 506.

Figure 6:
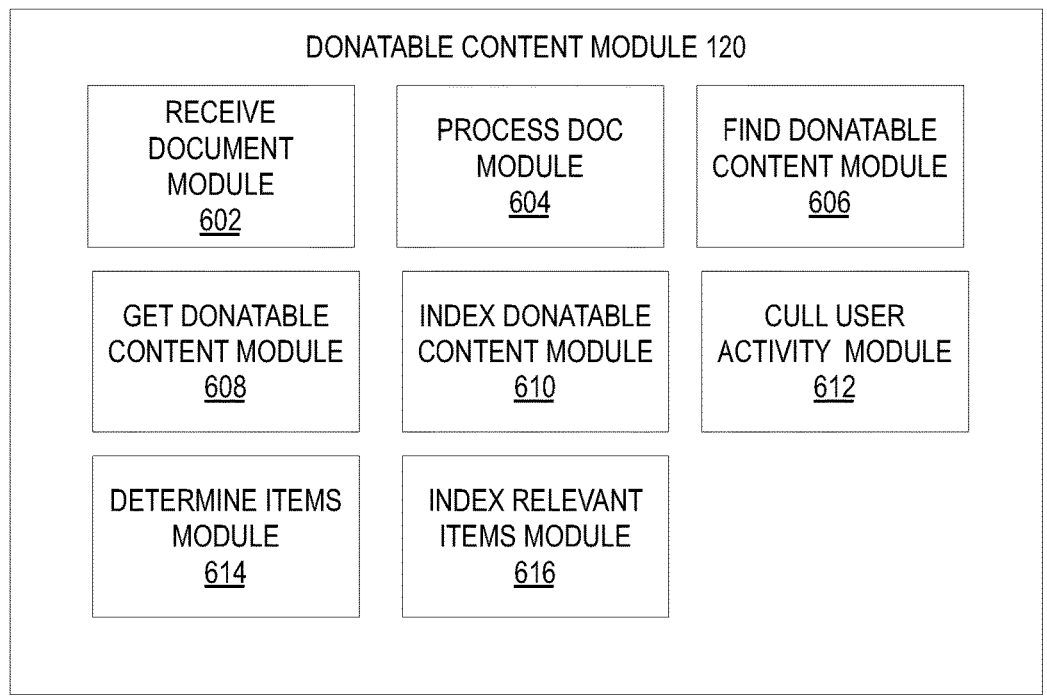
FIG. 6 is a block diagram of one embodiment of donatable content module that processes donatable content tags in a document and processes used activity for indexable content.

FIG. 6 is a block diagram of one embodiment of donatable content module 120 that processes donatable content tags in a document and processes used activity for indexable content. In one embodiment, the donatable content module 120 includes a receive document module 602, process document module 604, find donatable content module 606, get donatable content module 608, index donatable content module 610, cull user activity module 612, determine items module 614, and index relevant items 616. In one embodiment, the receive document module 602 receives the document as described in FIG. 4, block 402 above. The process document module 604 processes the document as described in FIG. 4, block 404 above. The find donatable content module 606 find the donatable content as described in FIG. 4, block 406 above. The get donatable content module 608 gets the donatable content as described in FIG. 4, block 408 above. The index donatable content module 610 indexes the donatable content as described in FIG. 4, block 410 above. The cull user activity module 612 culls the user activity as described in FIG. 5, block 502 above. The determine items module 614 determines the items visited (or not) as described in FIG. 5, block 504 above. The index relevant items 616 indexes the relevant items as described in FIG. 5, block 506 above.

The present disclosure recognizes that the use of such personal information data, in the present technology, can be used to the benefit of users. For example, the personal information data can be used to re-rank search results that is of greater interest to the user. Accordingly, use of such personal information data enables calculated control of the search results. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Figure 7:
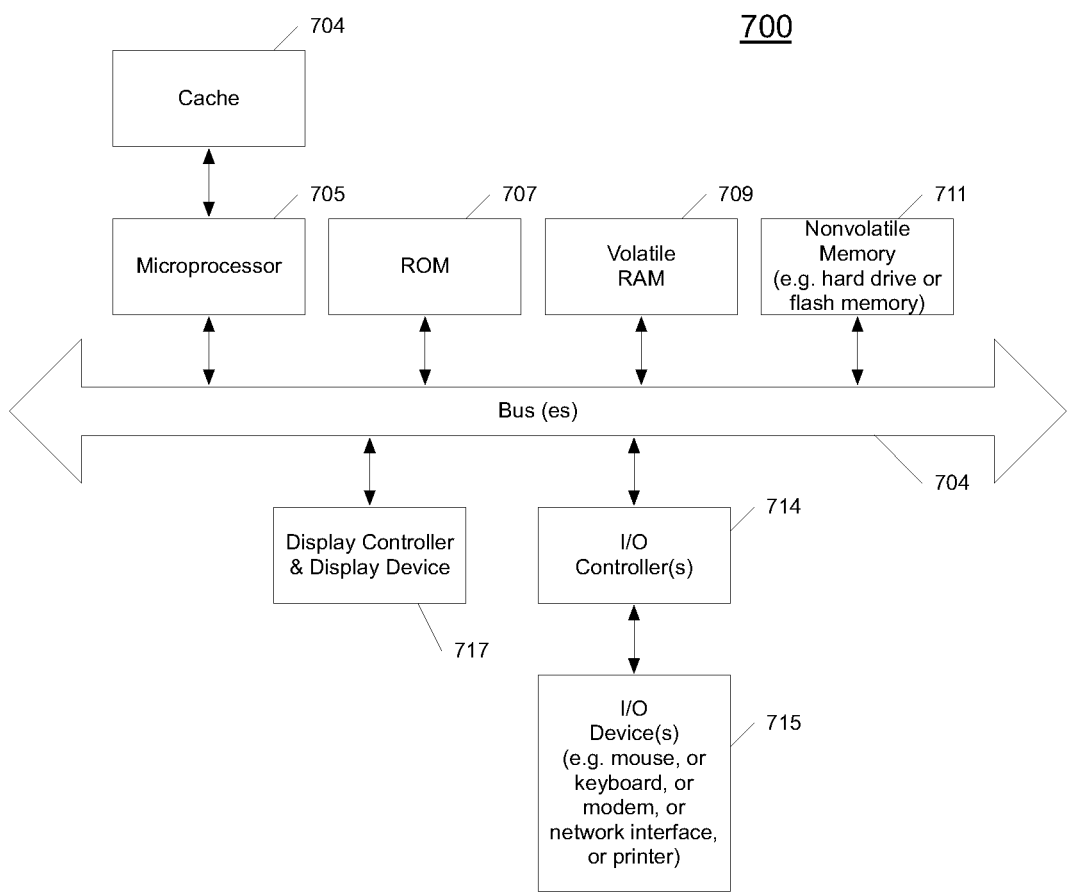
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented including a client 102 as shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may include one or more CPU(s), GPU(s), a specialized processor, and/or a combination thereof. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 717 and to peripheral devices such as input/output (I/O) devices which may be mice, keyboards, modems, network interfaces, printers and other devices which are well known in the art. Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD RAM or a flash memory or other types of memory systems, which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
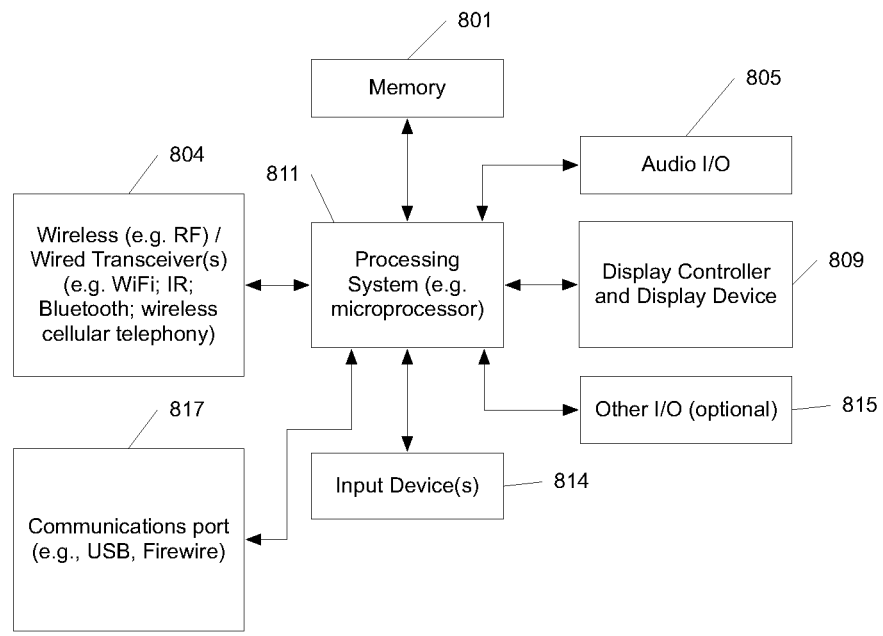
FIG. 8 shows an example of a data processing system, which may be used with one embodiment of the present invention.

FIG. 8 shows an example of another data processing system 800 which may be used with one embodiment of the present invention. For example, system 800 may be implemented as a client 102 as shown in FIG. 1. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805, which may include a microphone and a speaker for, for example, playing back music or providing telephone functionality through the speaker and microphone.

A display controller and display device 809 provide a visual user interface for the user; this digital interface may include a graphical user interface which is similar to that shown on a Macintosh computer when running OS X operating system software, or Apple iPhone when running the iOS operating system, etc. The system 800 also includes one or more wireless transceivers 803 to communicate with another data processing system, such as the system 800 of FIG. 8. A wireless transceiver may be a WLAN transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 8 may also be used in a data processing system. The system 800 further includes one or more communications ports 817 to communicate with another data processing system, such as the system 700 of FIG. 7. The communications port may be a USB port, Firewire port, Bluetooth interface, etc.

The data processing system 800 also includes one or more input devices 813, which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 800 may be a network computer or an embedded processing device within another device, or other types of data processing systems, which have fewer components or perhaps more components than that shown in FIG. 8.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone (s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "authenticating," "receiving," "determining," "computing," "sending," "retrieving," "prompting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable medium having executable instructions to cause one or more processing units to perform a method to index donatable content from a network site, the method comprising:
- receiving, with a device, a requested document, wherein the requested document includes a plurality of tags;
- detecting a donatable tag in the plurality of tags that indicates the network site includes donatable content, wherein the donatable content is metadata for a plurality of remotely downloadable objects accessible from the network site;
- in response to the detecting, sending a request for the donatable content to the network site;
- receiving the donatable content from the network site and the donatable content includes metadata for a cloud-based document associated with a cloud-based application; and
- indexing, with the device, the donatable content into an on-device search index, wherein at least some of the indexed donatable content is further returned as a search result for an on-device search.

2. The machine-readable medium of claim 1, wherein each of the metadata includes a time-to-live, wherein the metadata is removed from the index when the time-to-live expires for a corresponding downloadable object.

3. The machine-readable medium of claim 1, wherein requested document is a web page.

4. The machine-readable medium of claim 1, further comprising:
- authenticating a user with the network site.

5. The machine-readable medium of claim 4, wherein the cloud-based document is associated with the authenticated user.

6. The machine-readable medium of claim 1, further comprising:
- prompting a user to download the donatable content.

7. The machine-readable medium of claim 6, wherein the donatable content is received when the user agrees to download the donatable content.

8. A method to index donatable content from a network site, the method comprising:
- receiving, with a device, a requested document, wherein the requested document includes a plurality of tags;
- detecting a donatable tag in the plurality of tags that indicates the network site includes donatable content, wherein the donatable content is metadata for a plurality of remotely downloadable objects accessible from the network site;
- in response to the detecting, sending a request for the donatable content to the network site;
- receiving the donatable content from the network site and the donatable content includes metadata for the cloud-based document associated with a cloud-based application; and
- indexing, with the device, the donatable content into an on-device search index, wherein at least some of the indexed donatable content is further returned as a search result for an on-device search.

9. The method of claim 8, wherein each of the metadata includes a time-to-live, wherein the metadata is removed from the index when the time-to-live expires for a corresponding downloadable object.

10. The method of claim 8, wherein requested document is a web page.

11. The method of claim 8, further comprising:
- authenticating a user with the network site.

12. The method of claim 11, wherein the cloud-based document is associated with the authenticated user.

13. The method of claim 8, further comprising:
- prompting a user to download the donatable content.

14. The method of claim 13, wherein the donatable content is received when the user agrees to download the donatable content.

15. A device to index donatable content from a network site, the device comprising:
- at least one processor;
- a memory coupled to the processor through a bus; and
- a process executed from the memory by the processor that causes the processor to receive a requested document from the network site, wherein the requested document includes a plurality of tags, detect a donatable tag in the plurality of tags that indicates the network site includes donatable content, in response to the detecting, send a request for the donatable content to the network site, receive the donatable content from the network site, and index the donatable content into an on-device search index, wherein the donatable content is metadata for a plurality of remotely downloadable objects accessible from the network site and the donatable content includes metadata for a cloud-based document associated with a cloud-based application, and at least some of the indexed donatable content is further returned as a search result for an on-device search.

* * * * *